Oct. 6, 1970     E. KOPP     3,532,776
METHOD OF MAKING DENTAL CASTING PATTERNS
Filed Dec. 16, 1965     2 Sheets-Sheet 2
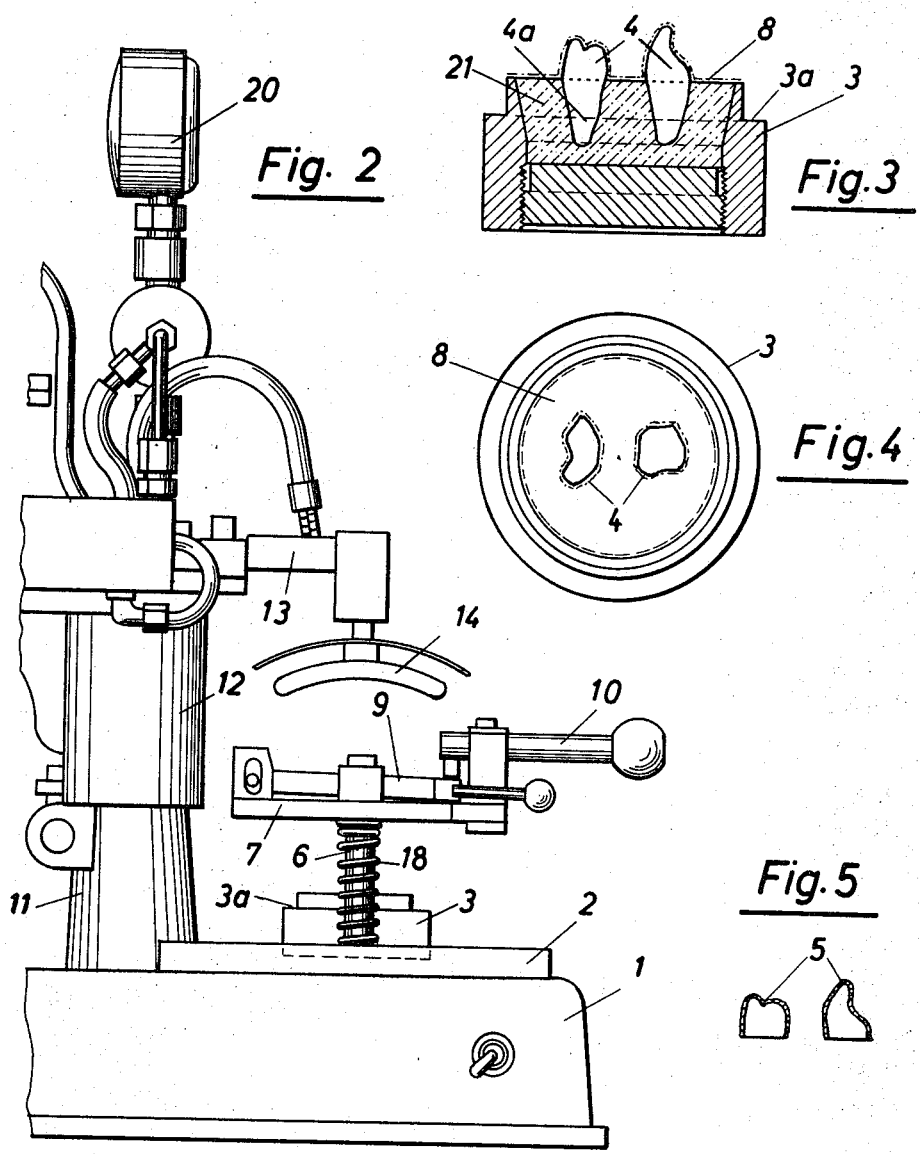
INVENTOR
Erich Kopp
BY Lowry & Rinehart
ATTORNEYS

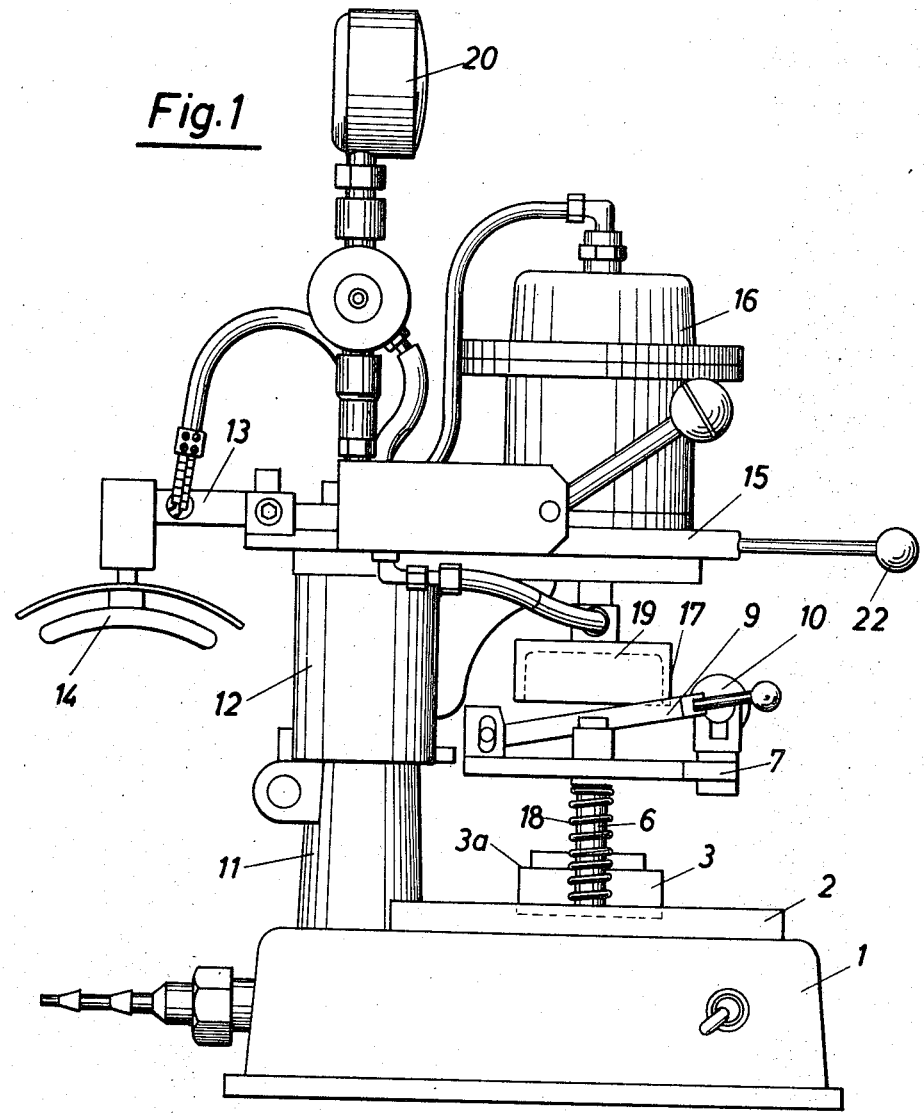

United States Patent Office 3,532,776
Patented Oct. 6, 1970

3,532,776
METHOD OF MAKING DENTAL CASTING PATTERNS
Erich Kopp, Pfalzgrafenweiler, Germany
Filed Dec. 16, 1965, Ser. No. 514,286
Claims priority, application Germany, Dec. 17, 1964,
K 54,816
Int. Cl. A61c *13/08;* B22c *7/02;* B29c *1/02*
U.S. Cl. 264—19        15 Claims

ABSTRACT OF THE DISCLOSURE

This disclosure provides a method for making dental castings which have a thin wall thiickness in at least a portion thereof. A dental die model of at least one tooth form from an individual and a sheet of thermoplastic material are provided. The sheet of thermoplastic material is heated and the softened sheet is conformed to the dental die model thereby forming an accurate reproduction thereof. The material in the reproduction is then cooled to form the thermoplasic material into a shaped dental casting pattern. The dental casting pattern is embedded in a molding means and subsequently removed to form a mold cavity therein. Molten metal is poured into the molding means to form a dental casting in the mold cavity. The conforming step may include the step of effecting a different air pressure on each side of the sheet to fit over the dental die model to aid in the formation of the accurate reproduction thereof. The conforming step may also include the step of mechanically stretching the softened sheet of thermoplastic material over the dental die model by an amount effective to avoid formation of folds therein.

BACKGROUND OF THE INVENTION

The present state of dentistry requires ever finer and more intricately shaped casting patterns for the manufacture of crowns, bridges, cast clasps and the like. In most instances extremely thin wall thicknesses are, at least locally, involved which, for example, on the labial side of facing crowns may be only about 0.2 mm.

Such casting patterns have hitherto been made of wax in a time-consuming manual operation which may be carried out, for example, by heating an appropriately thin sheet of wax over a flame and then pressing it onto a pattern support or dental die model, e.g. the pattern of a tooth stump, or form from an individual, or by repeatedly immersing the pattern support or dental die model in molten wax.

In both cases a wax cap is obtained as a basic pattern which is to correspond to the thinnest portion of the casting pattern, and on this wax cap then the remaining part of the pattern, e.g. the remaining crown wall up to the cutting edge or the like, is also built up in wax, and, if required, retention means for a front facing of plastics or porcelain or the like are provided.

In this operation it is difficult to achieve thin wax walls of constant wall thickness, to avoid spots or portions which result too thin unintentionally, and, above all, to remove the wax pattern undamaged from the pattern support so that it can subsequently be embedded and cast in metal. It happens only too often that parts of the delicate wax form are deformed or broken or that the entire pattern is destroyed altogether. The whole time-consuming operation then has to be repeated.

The same applies, similarly, to the so-called telescopic crowns in which most accurate parallelism of the outer walls of the inner crown and the inner walls of the outer crown is the important thing. In this case, too, the pattern is formed of wax on a tooth stump pattern serving as pattern support. Subsequently, the model stump is inserted in the parallelometer together with the wax cap and the surplus wax is removed by moving the doctor blade of the parallelometer therearound. It is extremely difficult to maintain the rim of the inner crown in the region of the tooth neck in the required wall thicknes of about 0.2 mm. This rim results either too thick, then the crown will be too thick in the zone of the gums, or too thin and will be broken away when the wax cap is pulled off or it will be scraped through and the pattern is useless. Generally, this pulling off is particularly critical because the slightest deformation will cause the loss of parallelism.

It will be readily appreciated that this operation using a wax pattern is very time-consuming.

SUMMARY OF THE INVENTION

The present invention provides a method of making dental casting patterns which comprises the steps of mechanically applying a previously plasticized pattern foil or sheet of plastics to a pattern support for making a basic pattern of uniform wall thickness, said pattern support being the model of a tooth stump or the like and said pattern sheet having a thickness corresponding to the thinnest spot of a casting pattern to be made, severing said basic pattern after curing from the remaining part of said pattern sheet, embedding said basic pattern, and casting said basic pattern.

In certain cases it will be found expedient to effect the casting of the basic pattern only after previous application of wax to portions of said basic pattern which correspond to thicker portions of said casting pattern.

The casting itself is effected in a known manner by metal casting.

In a more specific embodiment of the invention, the application of the plastics pattern foils or sheets produces results particularly advantageous and simple when realized in a manner known per se by compressed air. In certain cases, especially where simple shapes are involved, it is also possible to work with a vacuum. It is emphasized however, that the specific use of compressed air and/or vacuum in the formation of dental casting patterns of the type contemplated by this invention has not heretofore been known in the prior art.

A casting pattern made by this method reliably has a minimum wall thickness corresponding to the chosen sheet, the parts additionally modeled on in wax having a rigid carrier so that any risk of fracture is precluded. The basic pattern is easily removable from the support.

The method of one of the embodiments of the invention preferablly uses plastics which burn in the mold without leaving residues, such as polymethacrylates, polyolefines and the like.

It is self-evident that the method of the invention is not only suitable for facing and telescopic crowns, which have been mentioned by way of example, but for almost all casting work occurring in dentistry. Even when making cast metal saddles, clasps, bands, wires, skeleton or rationed dental plates as well as total dental plates, the casting patterns according to my novel method can be made of plastic foils or sheets.

Since the basic pattern formed of the plastics pattern sheet will shrink after forming, and that in a higher degree than the hitherto customary wax pattern, so that in most cases such shrinkage can no longer be compensated in the usual manner by means of a more strongly expanding embedding compound, according to a further feature of the invention a compensating sheet of plastics material having a thickness corresponding to the shrinkage to be compensated may be applied, mechanically, prior to forming, directly and accurately fitting to the surface of the object to be formed. Preferably, this is so effected that the compensating sheet, prior to the forming, is applied to the surface of the pattern sheet facing the object to be formed and then plasticized and applied to the object together with the pattern sheet.

For the compensating sheet a synthetic material is chosen which is easily deformable, preferably has a somewhat lower melting point than the pattern sheet and, above all, does not combine with the latter, so that the compensating sheet can be easily removed after the forming operation.

When choosing the thickness of the compensating sheet, also the shrinkage of the casting should preferably be considered to ensure accurately fitting dimensions of the finished casting.

As materials for the pattern sheet and the compensating sheet polyethylene and polystyrene respectively, may be chosen, for example.

BRIEF DESCRIPTION OF DRAWINGS

The above-described method can be carried out analogously by different devices. A particularly expedient device for this application will be hereinafter described by way of example and with reference to the accompanying drawings, in which:

FIG. 1 is a side elevational view of the device according to the invention;

FIG. 2 is a view similar to FIG. 1, with parts broken away and showing the upper structure of the device turned through 180° with respect to FIG. 1;

FIG. 3 is a vertical section through a detail of the device;

FIG. 4 is a top plan view of the same detail, and

FIG. 5 is a sectional view of basic patterns produced by the device of FIGS. 1 and 2.

DESCRIPTION OF SPECIFIC EMBODIMENTS

With reference to FIGS. 1 and 2, the apparatus which is particularly suitable for carrying out the method of the invention comprises a base 1 with a working table 2 including a tray 3 for receiving pattern supports, such as tooth stump patterns 4 (FIGS. 3 and 4) or the like, which serve to make a basic pattern 5 (FIG. 5) of the final casting pattern.

Pillars 6 on the working table 2 carry axially slidable thereon a supporting plate 7 for a plastics pattern foil or sheet 8 (FIG. 3) which can be secured in place by means of a vertically pivotable clamping frame 9 to be fixed in its operative or clamping position by a locking lever 10.

A column 11 extending upwardly from the base 1 adjacent the working table 2 carries a rotary head 12 provided with an arm 13 carrying at one end thereof a heater 14, such as an infrared radiator or a hot air source or the like, and with another arm 15 carrying a pressure cylinder 16 with a blower head 17. The heater 14 and the blower head 17 can alternately be brought in a position above the supporting plate 7 with the sheet 8. The pressure cylinder 16 accommodates a piston or a diaphragm respectively, not shown, unilaterally acted upon, for instance, in the working direction, i.e. from above, by compressed air and arranged to move the blower head 17, which is influenced by a return spring, through its operative stroke.

The apparatus operates as follows:

The pattern support, e.g. tooth stump pattern 4, which the casting pattern is to be made to conform to has an extension 4a which need not be copied and by which it is embedded in plaster or plasticine or another kneadable or plastic compound 21 in the tray 3. The latter has the advantage that, unlike plaster, it involves no curing time and can be reused. The tray 3 is preferably made to be interchangeable so that after each working cycle it can be replaced by another one which has been prepared in the meantime. Such embedding is preferably effected so as to make the embedding compound flush with the upper edge of the tray 3, with the tooth stump pattern 4 projecting upwardly therefrom. Vents (not shown) may be provided in the bottom of the tray 3.

Upon insertion of the tray 3 in the working table 2 and after having clamped to the supporting surface 7 a plastics pattern foil or sheet, such as the sheet 8, of a thickness corresponding to the wall thickness of the final casting pattern where this is thinnest, the heater 14 is positioned above the sheet, as shown in FIG. 2. As soon as the sheet has sufficiently been plasticized by the heat, the heater 14 is replaced by the pressure cylinder 16 in that the rotary head 12 is rotated by means of a lever 22. When compressed air is admitted to the pressure cylinder from a supply, this causes the blower head 17 to descend onto the clamping frame 9 for the sheet and move on down, taking along the sheet and its supporting plate 7 against the action of springs 18 on the pillars 6 until the supporting plate 7 abuts against a shoulder 3a of the tray 3 so that the sheet comes to lie at the level of the upper rim of the tray 3 and the pattern support 4 to be copied projects into a front-end recess 19 in the blower head forming a pressure chamber. During the last part of its downward movement, the sheet is stretched forward over the support 4 according to the projecting height of the latter, whereby any formation of folds is avoided and uniform wall thickness is attained as soon as compressed air is introduced into the recess 19 of the blower head 17 to effect a different air pressure on each side of the sheet and press the sheet tightly around the pattern support which is thus copied with an accuracy determined by the adjusted pressure of the compressed air.

After the formed sheet or the like has cooled down, the blower head 17 is evacuated through an appropriate conduit and is restored, as well as the supporting plate 7, into its upper position by spring action, whereby the sheet is removed from the support. Upon unlocking of the clamping frame 9 the sheet is detached and the shaped part thereof, which forms a basic pattern of uniform wall thickness, such as the basic patterns 5 (FIG. 5), is cut off the rest of the sheet 8 by means of a knife or a severing disc, respectively.

As initially mentioned, such a basic pattern 5 can directly be used as a casting pattern, for example, in the manufacture of saddles or dental plates or ring cover crowns and solid cast crowns, in which cases the anatomic basic form has previously been molded in embedding compound or in a similar manner. If, however, an object such as a crown with locally increased wall thicknesses is to be cast, the additional thickness, e.g. on the triturating surface, is molded by applying wax to a basic pattern such as the pattern 5.

In order to obviate contraction of the formed basic pattern when this is cooling down, a compensating sheet may be used, as already mentioned, which is so chosen that its thickness corresponds to the contraction of the basic pattern to be compensated and preferably also to the final casting. Expediently such compensating sheet is also clamped to the supporting plate 7, that is, on the underside of the pattern sheet, to which it snugly adheres, and facing the pattern support to be copied.

Thus the compensating sheet is plasticized contemporaneously with the pattern sheet and pressed onto the pattern support. Upon completion of the forming operation the compensating sheet, which consists of a plastic that does not combine with the pattern sheet, is eliminated.

The sheets are mostly larger than the object to be copied or formed. To prevent in the non-deformed places between the sheets the presence of air bubbles which expand during the heating operation and may adversely affect accurate forming of the object, it is advantageous to provide the compensating sheet in the region of the non-deformed places thereof with holes through which the trapped air is allowed to escape.

The apparatus is provided with a pressure regulator 20 in the conduit leading to the blower head 17, whereas the pressure cylinder 16 is directly supplied with line pressure. The different switches for the heater 14 and for the compressed air conduits shown only partly in the drawings may be of any known type and actuable by hand or at least in part automatically, e.g. in dependence on the position of the rotary head 12.

It is to be understood that the heater 14 and the blower head 17 might as well be angularly displaced from each other through an angle of 90° instead of through 180° as illustrated in the drawings. In this case, two oppositely arranged working tables 2 with respective trays 3 might be provided and operated from the column 11 standing therebetween, the rotary head 12 either carrying a heater 14 and a blower head 17, as illustrated, or two pairs of such means arranged opposite each other. In the former alternative the two working tables might be used in turn for carrying out the heating and forming operations, whereas in the latter alternative these operations could be effected at the same time, using both tables simultaneously.

It is further to be understood that also other details of the device as herein described and illustrated in the accompanying drawings may be modified analogously within the scope of the invention. For example, on principle it is also possible that the heater and the blower head are stationary while the working table is arranged so as to be rotatable into the two respective working positions.

As already implied, for making the basic casting pattern also a vacuum may be used instead of compressed air. Finally, if the basic pattern to be made is of simple geometric internal shape, also a simple mechanical press, such as a screw press, may be employed to form the basic dental casting pattern.

Be it still noted that the applicatiton of the compensating sheet is not limited to dentistry and to the hereinbefore described combination of such compensating sheet with a basic or casting pattern made of a plastics sheet, but can also be extended to shrinkage compensation in general.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:
1. A method of making dental castings comprising:
   (a) providing a dental die model of at least one tooth form from an individual,
   (b) providing a sheet of thermoplastic material,
   (c) heating the sheet to soften the material therein,
   (d) conforming the softened sheet to the dental die model to form an accurate reproduction thereof,
   (e) cooling the reproduction to form the thermoplastic material into a shaped, dental casting pattern,
   (f) embedding the cooled dental casting pattern in a molding means,
   (g) removing the material of the dental casting pattern from the molding means to form a mold cavity therein, and
   (h) pouring molten material into the molding means to form a cast dental article in the mold cavity.
2. A method as defined in claim 1 including the step of
   applying wax to form thickened portions on the reproduction after the cooling step for casting a dental article having variable thicknesses.
3. A method as defined in claim 1 wherein
   the conforming step includes stretching the softened sheet of thermoplastic material over the dental die model by an amount effective to avoid formation of folds therein.
4. A method as defined in claim 1 wherein
   the conforming step comprises mechanically pressing the softened sheet over the dental die model.
5. The method as defined in claim 1 wherein
   the thermoplastic material is disintegratable at elevated temperatures and the removing step includes heating the molding means to disintegrate the thermoplastic material thereby forming said cavity.
6. A method as defined in claim 5 wherein
   said thermoplastic material is selected from the group consisting of polymethacylates and polyolefines.
7. A method as defined in claim 5 wherein
   the conforming step includes effecting a different air pressure on each side of the sheet when the softened sheet is placed over the die model.
8. A method as defined in claim 7 wherein
   a positive compressed air pressure is applied on the side of the softened thermoplastic sheet opposite the dental die model to effect the different air pressure on each side thereof.
9. A method as defined in claim 7 wherein
   a vacuum is formed on the same side of the softened thermoplastic sheet as the dental die model to effect the different air pressure on each side thereof.
10. A method of making dental castings comprising:
    (a) providing a dental die model of at least one tooth form from an individual,
    (b) providing a first sheet of thermoplastic material for forming a dental casting pattern,
    (c) providing a second sheet of thermoplastic material for forming a shrinkage compensating layer between the first sheet and said dental die model,
    (d) heating the sheets to soften the material therein,
    (e) placing the second sheet on the dental die model and then
    (f) conforming the softened first sheet to the dental die model with the second sheet disposed therebetween to form an accurate reproduction of the said model,
    (g) said second sheet having a thickness effective to compensate for the amount of shrinkage resulting upon the cooling of the first thermoplastic sheet,
    (h) cooling the reproduction to form the thermoplastic material into a shaped, dental casting pattern,
    (i) embedding the cooled dental casting pattern in a molding means,
    (j) removing the material of the dental castign pattern from the molding means to form a mold cavity therein, and
    (k) pouring molten material into the molding means to form a cast dental article in the mold cavity.
11. A method as defined in claim 10 wherein
    the thermoplastic material of the first sheet and the thermoplastic material of the second compensating sheet do not combine with each other upon heating and
    the material of the second compensating sheet is removed from the cooled dental casting pattern before being embedded in the molding means.
12. A method as defined in claim 11 wherein
    the second sheet of thermoplastic material includes openings therein to provide a vent for any trapped gases when the thermoplastic sheets are applied to the dental die model.
13. A method as defined in claim 11 wherein
    the conforming step comprises mechanically pressing the softened sheets over the dental die model.
14. A method as defined in claim 11 wherein
    the thermoplastic material is disintegratable at elevated temperatures and
    the removing step includes heating the molding means to disintegrate the thermoplastic material of the first sheet thereby forming said cavity.

15. The method as defined in claim 14 wherein the conforming step includes effecting a different air pressure on each side of the sheet when the softened sheet is placed over the die model.

References Cited

UNITED STATES PATENTS

| | | | |
|---|---|---|---|
| 1,304,396 | 5/1919 | Smith | 264—19 |
| 1,335,372 | 3/1920 | Fredricks | 264—19 |
| 1,896,123 | 2/1933 | Schweitzer | 264—19 |
| 2,186,468 | 1/1940 | Schwartz | 264—19 |
| 2,249,890 | 7/1941 | Droge | 264—19 |
| 2,271,454 | 1/1942 | Erdle et al. | 264—19 |
| 2,391,106 | 12/1945 | Saffir | 264—19 |
| 2,474,676 | 6/1949 | Kelly | 264—94 |
| 2,989,780 | 6/1961 | Zimmerman | 264—92 |
| 3,021,569 | 2/1962 | Lyman | 264—92 |
| 3,058,216 | 10/1962 | Cohen | 264—19 |
| 1,456,472 | 8/1923 | Hansen | 32—12 |
| 2,219,058 | 10/1940 | Streim | 32—12 |
| 3,404,056 | 10/1968 | Baldwin | 264—16 |

FOREIGN PATENTS 264,558  10/1913  Germany.

DONALD J. ARNOLD, Primary Examiner

A. H. KOECKERT, Assistant Examiner

U.S. Cl. X.R.

32—12; 164—7, 34, 160; 264—89, 92, 221